(12) United States Patent
Li et al.

(10) Patent No.: US 10,660,114 B2
(45) Date of Patent: May 19, 2020

(54) FDM TRANSMISSION FOR INTER-RAT DUAL CONNECTIVITY UE

(71) Applicant: Apple Inc., Cupertino, CA (US)

(72) Inventors: Yang Li, Plano, TX (US); Wei Zeng, San Diego, CA (US); Zhu Ji, San Jose, CA (US); Beibei Wang, Cupertino, CA (US); Jia Tang, San Jose, CA (US); Yuchul Kim, Santa Clara, CA (US); Haijing Hu, Beijing (CN); Dawei Zhang, Saratoga, CA (US); Xiangying Yang, Cupertino, CA (US); Sami M. Almalfouh, San Jose, CA (US); Johnson O. Sebeni, Fremont, CA (US); Wei Zhang, Santa Clara, CA (US); Tianyan Pu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 15/969,653

(22) Filed: May 2, 2018

(65) Prior Publication Data
US 2018/0368153 A1 Dec. 20, 2018

Related U.S. Application Data

(60) Provisional application No. 62/520,219, filed on Jun. 15, 2017.

(51) Int. Cl.
*H04W 72/12* (2009.01)
*H04W 76/16* (2018.01)
(Continued)

(52) U.S. Cl.
CPC ....... *H04W 72/12* (2013.01); *H04W 72/1215* (2013.01); *H04W 76/16* (2018.02);
(Continued)

(58) Field of Classification Search
CPC ... H04W 72/12; H04W 84/042; H04W 88/06; H04W 72/1215; H04W 76/16; H04J 1/00
See application file for complete search history.

(56) References Cited

U.S. PATENT DOCUMENTS 9,525,992 B2 12/2016 Rao et al.
9,544,937 B2 1/2017 Su et al.
(Continued)

FOREIGN PATENT DOCUMENTS

WO WO 2018/029493 2/2018
WO WO 2018/031746 2/2018

OTHER PUBLICATIONS

LG Electronics; "Discussion on NR-LTE coexistence for UL transmission"; 3GPP Draft; RI-1704939; 3rd Generation Partnership Project (3GPP); Mobile Competence Centre; 650, Route Des Lucioles; F-06921 Sophia-Antipolis Cedex; France; vol. RAN WGI, No. Spokane, USA; Apr. 2, 2017; XP051243073; retrieved on Apr. 2, 2017; three pages.
(Continued)

*Primary Examiner* — Vinncelas Louis
(74) *Attorney, Agent, or Firm* — Kowert Hood Munyon Rankin and Goetzel PC; Jeffrey C. Hood

(57) ABSTRACT

Apparatuses, systems, and methods for a wireless device to perform simultaneous uplink activity for multiple RATs in the same carrier using frequency division multiplexing. The wireless device may establish a first wireless link with a first base station according to a first radio access technology (RAT) and a second wireless link with a second base station according to a second RAT. The first base station may provide a first cell operating in a first system bandwidth and the second base station may provide a second cell operating in a second system bandwidth. The wireless device may determine whether the wireless device has uplink activity scheduled according to both the first RAT and the second
(Continued)

RAT. If so, the wireless device may perform uplink activity for both the first RAT and the second RAT in the first system bandwidth using frequency division multiplexing.

20 Claims, 12 Drawing Sheets

(51) Int. Cl.
    *H04J 1/00*     (2006.01)
    *H04W 84/04*     (2009.01)
    *H04W 88/06*     (2009.01)

(52) U.S. Cl.
    CPC .............. *H04J 1/00* (2013.01); *H04W 84/042* (2013.01); *H04W 88/06* (2013.01)

(56) References Cited

U.S. PATENT DOCUMENTS

| | | |
|---|---|---|
| 9,806,836 B2 | 10/2017 | Sadek et al. |
| 2012/0230268 A1 | 9/2012 | Marinier |
| 2017/0026950 A1 | 1/2017 | Cao et al. |
| 2017/0048151 A1 | 2/2017 | Jung et al. |
| 2017/0347271 A1* | 11/2017 | Baldemair ............ H04W 16/14 |
| 2017/0374607 A1 | 12/2017 | Wu |

OTHER PUBLICATIONS

Huawei; "[88b-15] Email discussion on LTE NR UL coexistence"; 3GPP Draft; RI-1706907; 3rd Generation Partnership Project (3GPP); Mobile Competence Centre; 650, Route Des Lucioles; F-06921; Sophia-Antipolis Cedex; France; vol. RAN WGI, No. Hangzhou, China; May 17, 2017: XP051285051; retrieved on May 17, 2017; five pages.

Samsung: "LTE-NR Coexistence for UL"; 3GPP Draft; RI-1708062; 3rd Generation Partnership Project (3GPP), Mobile Competence Centre; 650, Route Des Lucioles; F-06921; Sophia-Antipolis Cedex; France; vol. RAN WGI, No. Hangzhou, China; May 4, 2017; XP051261264; retrieved on May 4, 2017; eight pages.

Qualcomm Incorporated; "NR-LTE Co-channel Coexistence Considerations"; 3GPP Draft; RI-1708655; 3rd Generation Partnership Project (3GPP), Mobile Competence Centre; 650, Route Des Lucioles; F-06921 Sophia-Antipolis Cedex; France; vol. RAN WGI, No. Hangzhou, China; May 14, 2017; XP051273842; retrieved on May 14, 2017; six pages.

Huawei et al; "Overview of NR UL for LTE-NR coexistence": 3GPP Draft; RI-1709383; 3rd Generation Partnership Project (3GPP), Mobile Competence Centre; 650, Route Des Lucioles; F-06921 Sophia-Antipolis Cedex; France; vol. RAN WGI, No. Hangzhou, China; May 17, 2017; XP051285096; retrieved on May 17, 2017; 15 pages.

International Search Report and Written Opinion, Application No. PCT/US2018/035151, dated Jul. 25, 2018, 14 pages.

\* cited by examiner

| UE1 PUCCH | UE1/UE2 PUCCH | UE1 PUCCH | UE1/UE2 PUCCH |
|---|---|---|---|
| UE2 LTE UL | UE2 NR UL | UE2 LTE UL | UE2 NR UL |
| | | | LTE PRACH |
| UE1 PUCCH | UE1/UE2 PUCCH | UE1 PUCCH | UE1/UE2 PUCCH |
| LTE Subframe for UE2 | NR Subframe for UE2 | LTE Subframe for UE2 | NR Subframe for UE2 |

*FIG. 18*

FDM TRANSMISSION FOR INTER-RAT DUAL CONNECTIVITY UE

PRIORITY INFORMATION

This application claims priority to U.S. provisional patent application Ser. No. 62/520,219, entitled "FDM Transmission for Inter-RAT Dual Connectivity UE," filed Jun. 15, 2017, which is hereby incorporated by reference in its entirety as though fully and completely set forth herein.

FIELD

The present application relates to wireless devices, and more particularly to apparatus, systems, and methods for a wireless device to establish and maintain concurrent connections with current radio access technologies and next generation radio access technologies.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to perform attachment of a wireless device to concurrent (or substantially concurrent) connections with a next generation network node (e.g., a fifth generation new radio (5G NR) network node) and a legacy network node (e.g., an LTE network node).

According to some embodiments, a wireless device may include a first radio in communication with a first antenna and a second radio in communication with a second antenna. The first radio may be configured to perform cellular communication according to a first radio access technology (RAT) and the second radio may be configured to perform cellular communication according to a second RAT.

According to some embodiments, the wireless device may utilize FDM transmission techniques to support simultaneous inter-RAT dual uplink connectivity on the same frequency carrier.

The FDM techniques may include performing uplink activity for multiple RATs in the system bandwidth of one RAT, at least when uplink activity for multiple RATs is scheduled at the same time. For example, during such times, some portion of the system bandwidth may be used to transmit signals according to one RAT, while another portion of the system bandwidth may be used to transmit signals according to another RAT. If desired, a guard band (e.g., in which no uplink signals are transmitted by the wireless device) may be implemented between the portions used to transmit signals according to the first and second RATs. The portions of the system bandwidth used for each RAT, and/or the portion used for the guard band, may be statically and/or dynamically configured, as desired.

When FDM techniques are used to perform uplink activity for multiple RATs on one frequency carrier, any of numerous possible transmission configurations can be utilized to support such techniques. For example, a wireless device may implement separate transmit chains for each RAT that can separately prepare and transmit signals on the same frequency carrier, or some portion of the RATs' transmit chains can be shared when performing FDM, e.g., such that signals for the multiple RATs are multiplexed at some point in the transmit chain. Such multiplexing could be performed in the time domain (e.g., in the digital domain or the analog domain) or in the frequency domain, as desired.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 18 illustrates an example scenario in which LTE uplink control resources can be semi-statically reserved for legacy and/or dual connectivity UEs, according to some embodiments.

Figure 1:
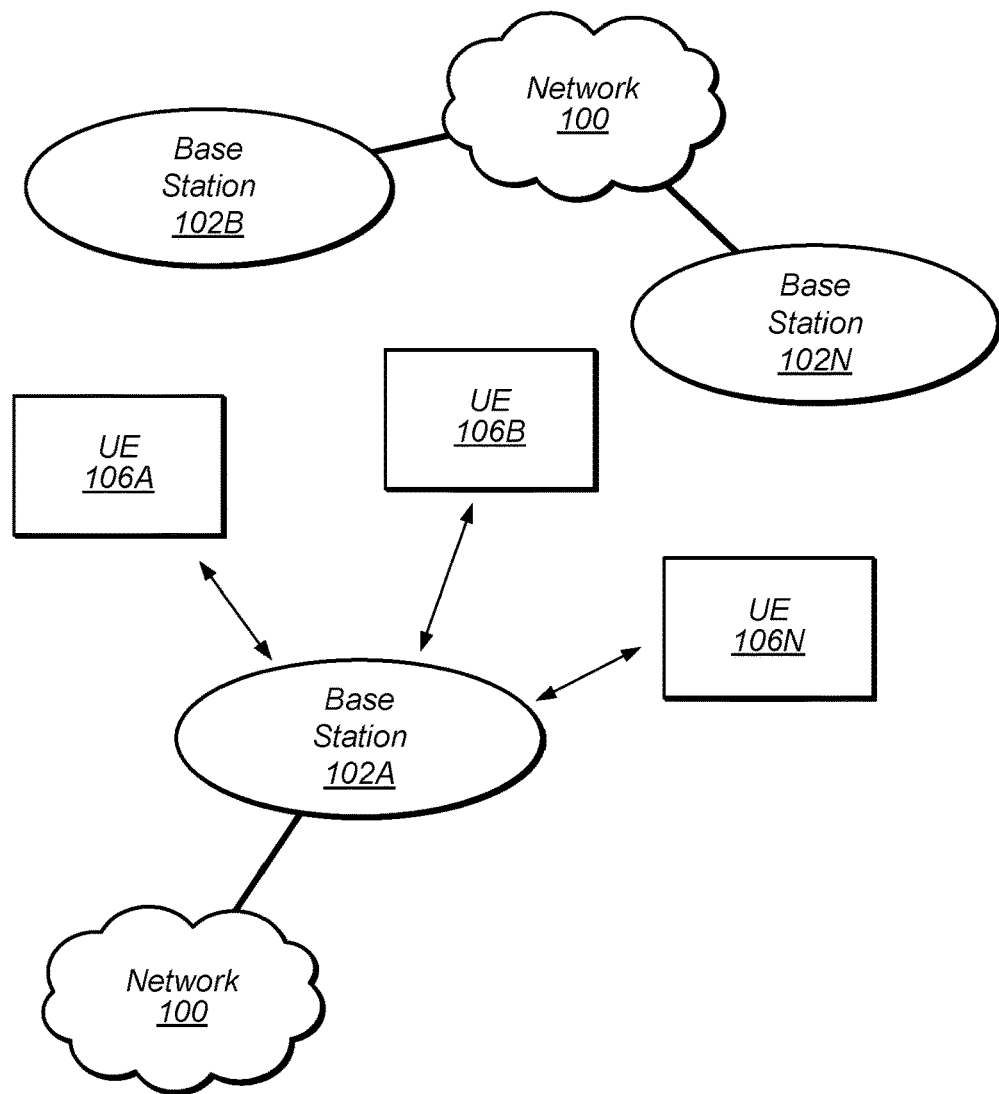
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
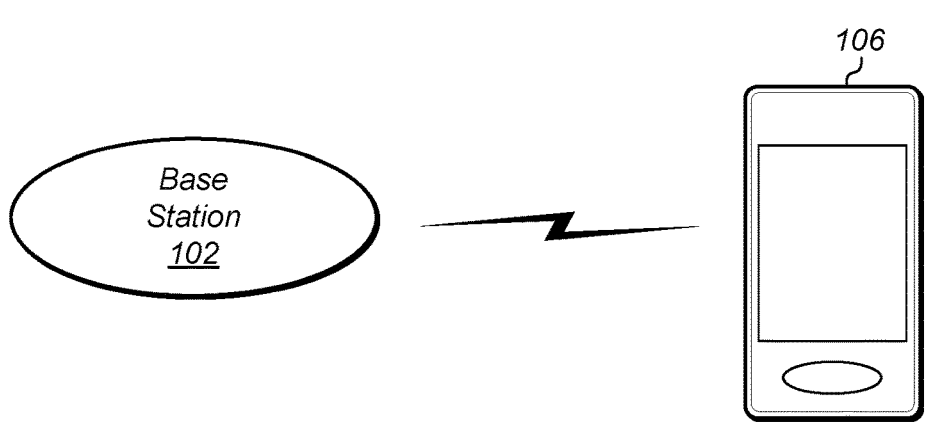
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT, or LTE or GSM), and separate radios for communicating using each of Wi-Fi and Bluetooth. Other configurations are also possible.

Figure 3:
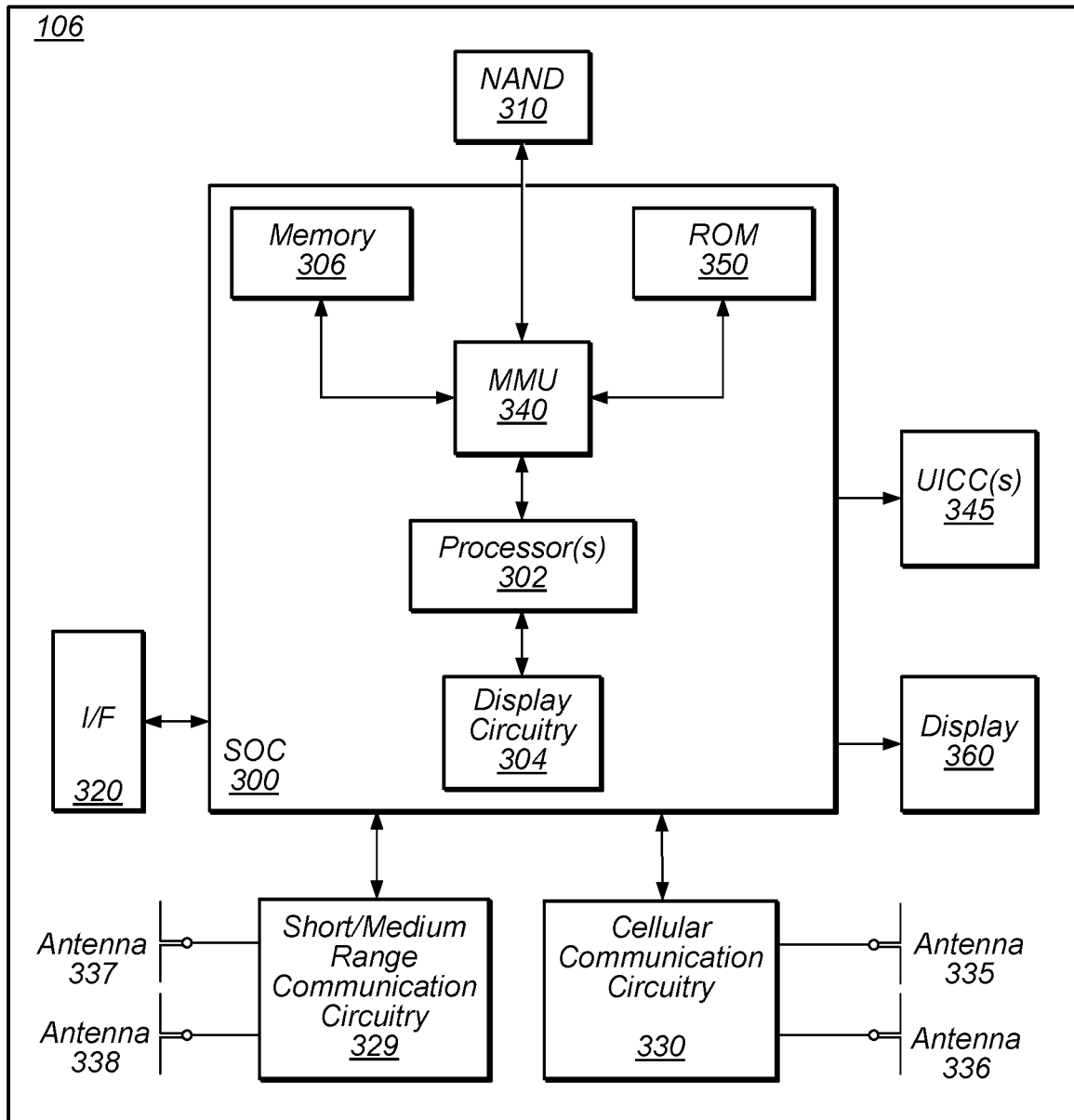
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing features for frequency division multiplexing transmissions according to multiple radio access technologies in the same frequency carrier, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 335, 336, 337, 338, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
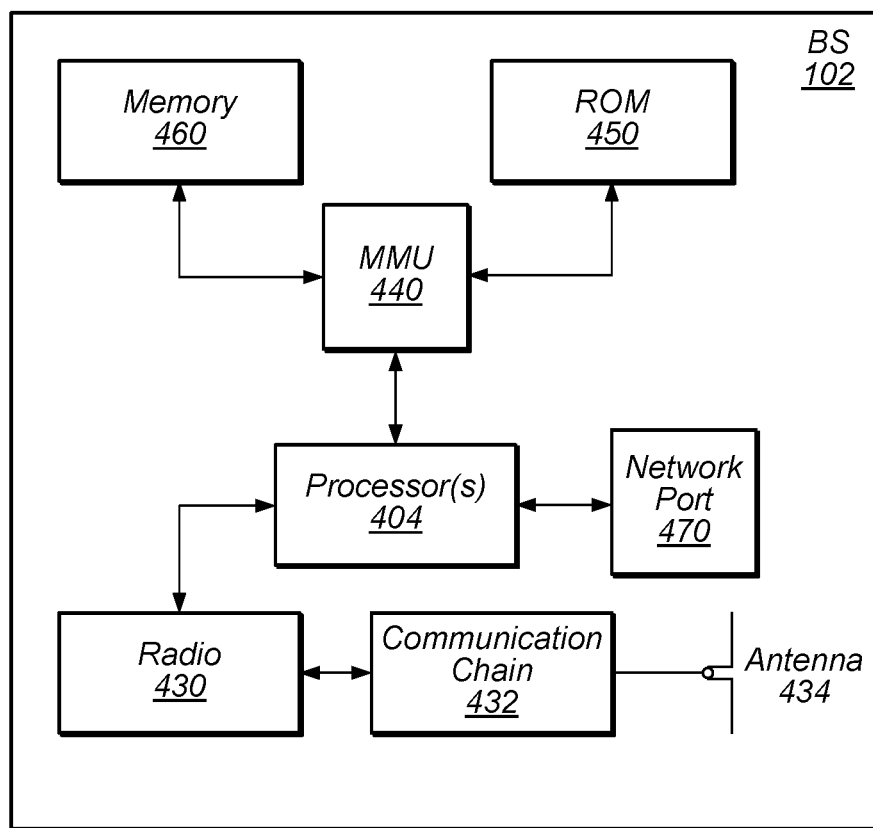
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a "next generation" base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
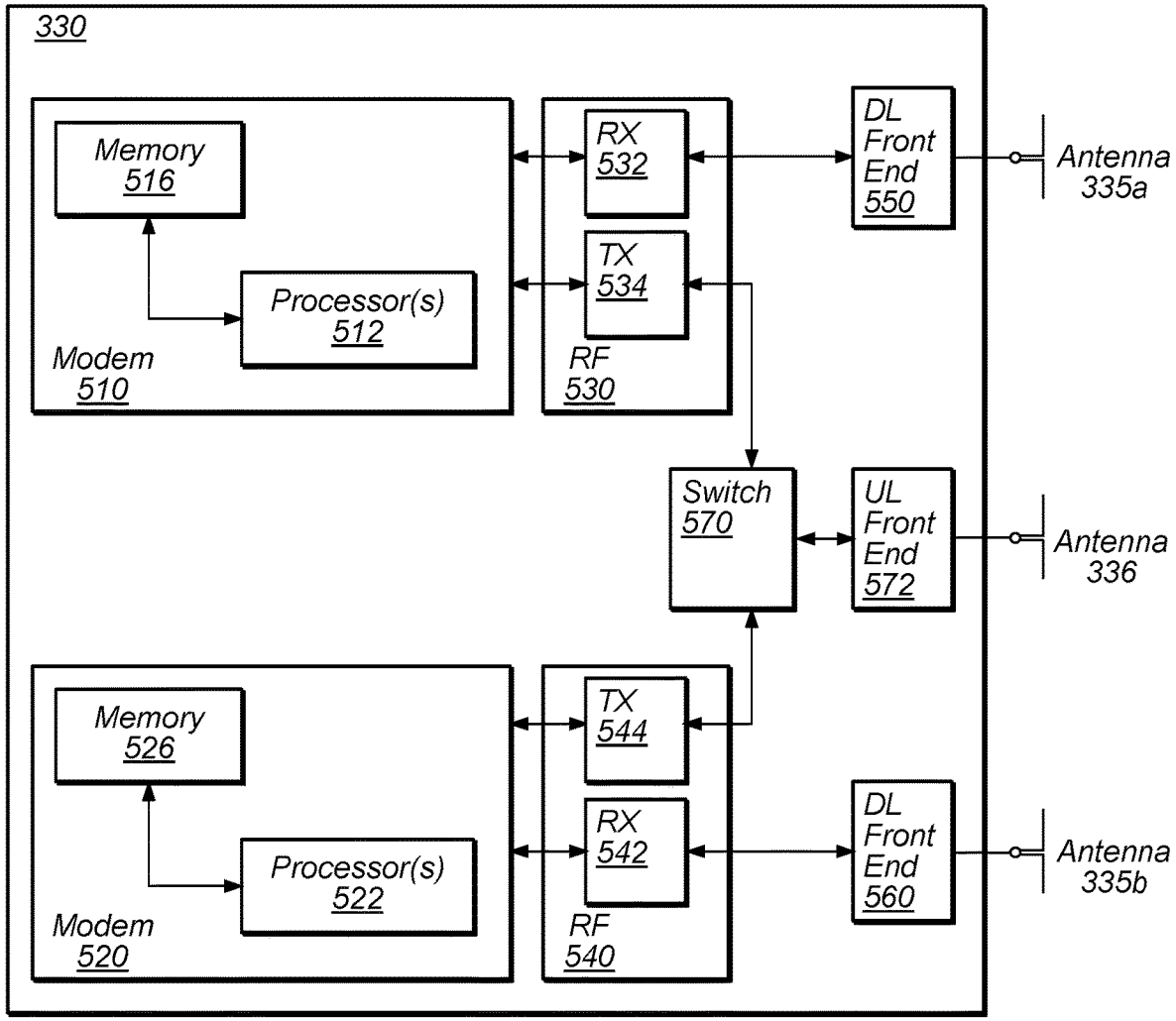
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be include in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for frequency division multiplexing transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing features for frequency division multiplexing transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
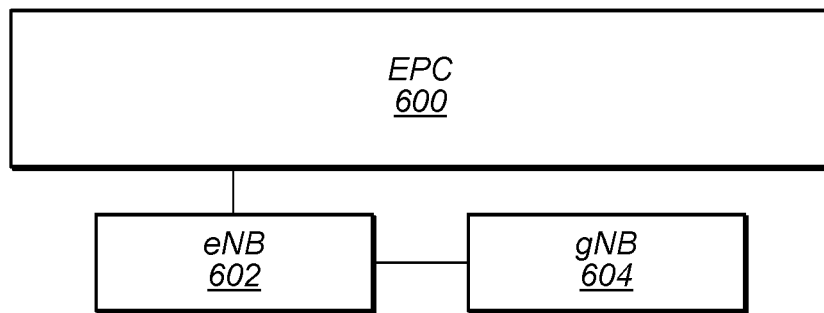
FIG. 6A illustrates an example of connections between an EPC network, an LTE base station (eNB), and a 5G NR base station (gNB), according to some embodiments.
Figure 6B:
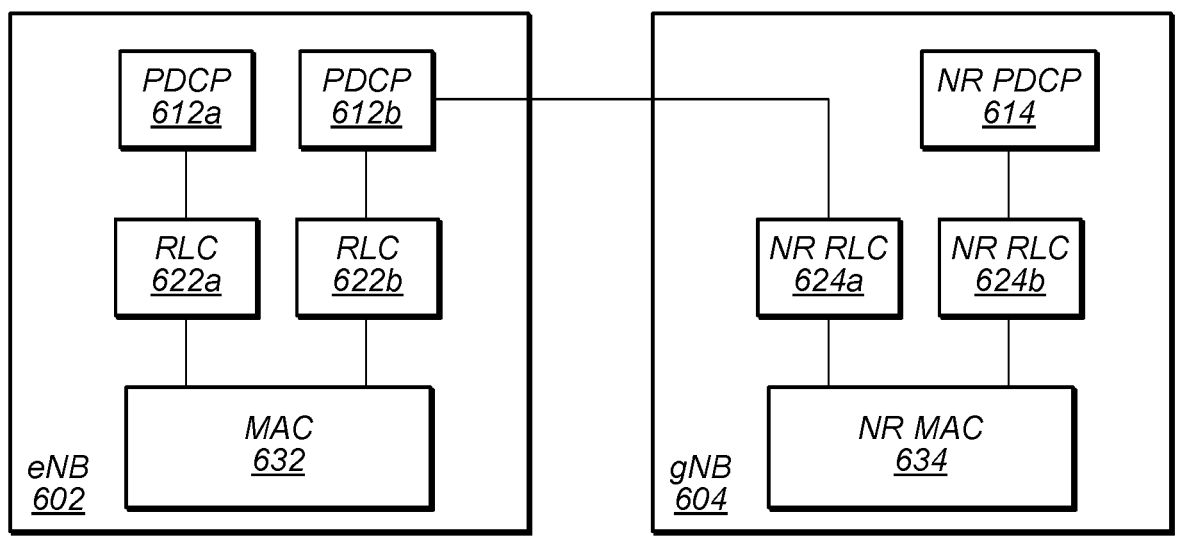
FIG. 6B illustrates an example of a protocol stack for an eNB and a gNB, according to some embodiments.

FIGS. 6A-6B—5G NR Non-Standalone (NSA) Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer to EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

In general, a non-stand alone (NSA) implementation employs dual connectivity in both uplink (UL) and downlink (DL). In other words, dual connectivity requires two active radio links in both UL and DL. In some implementations, depending on frequency band combinations, two (substantially) concurrent UL connections may cause receiver sensitivity degradation at the UE. For example, in some proposed implementations, a UE may be required to support 4 DL and 1 UL connection in LTE on bands 1 (UL: 1920-1980 MHz, DL: 2110-2170 MHz), 3 (UL: 1710-1785 MHz, DL: 1805-1880 MHz), 7 (UL: 2500-2570 MHz, DL: 2620-2690 MHz), and 20 (UL: 832-862 MHz, DL: 791-821 MHz) while (substantially) concurrently supporting 1 DL and 1 UL connection in NR at 3400-3800 MHz. In such implementations, a $5^{th}$ order intermodulation product (IM5) produced at a 5G NR transmitter of the UE from a $2^{nd}$ harmonic of LTE UL band 3 and NR UL may fall into LTE DL band 7 frequencies during (substantially) simultaneous UL operation. Similarly, a 4th order harmonic of LTE UL band 20 and NR UL transmission may create a $5^{th}$ order intermodulation product that may interfere with LTE DL band 7 reception and thus desensitize receiving for LTE DL band 7.

In addition, future specifications of NR NSA may require a UE to support co-existence of LTE UL and NR UL within the bandwidth of an LTE component carrier and co-existence of LTE DL and NR DL within the bandwidth of an LTE component carrier. Further, such an implementation may be further required to minimize impact to NR physical layer design to enable such co-existence and to not impact LTE legacy devices (e.g., devices that do not support NR) operating on an LTE carrier co-existing with NR.

Thus, in some implementations of NR NSA, a UE may be configured with multiple UL carriers on different frequencies (e.g., where there is at least one LTE carrier and at least one NR carrier of a different carrier frequency) but operate on either the LTE carrier or the NR carrier at a given time. In other words, the UE may be configured to operate on only one of the carriers at a given time among a pair of LTE and NR carriers. Note that such an implementation may also allow for (substantially) simultaneous operation on two or more UL carriers at a given time.

Embodiments described herein define systems, methods, and mechanisms for a UE to support 5G NSA operation.

Figure 7:
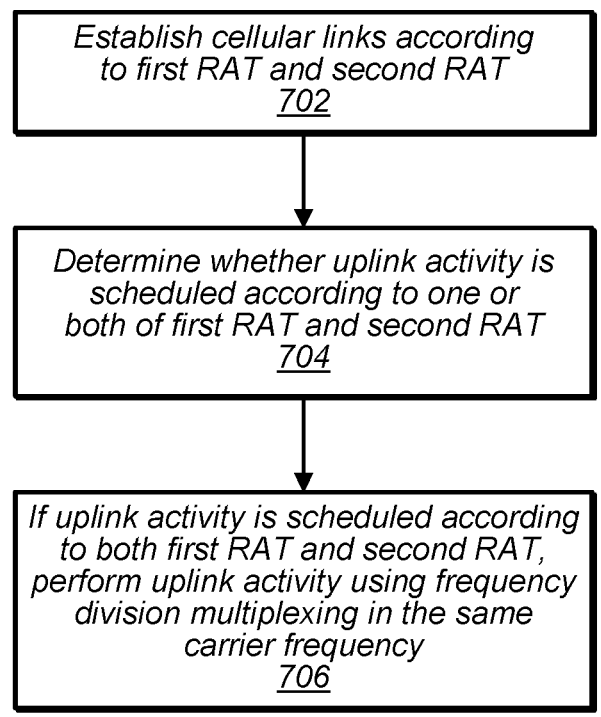
FIG. 7 illustrates a block diagram of an example of a method for using FDM transmission in the same carrier frequency for inter-RAT dual connectivity, according to some embodiments.

FIG. 7—FDM Transmission for Inter-RAT Dual Connectivity

As one possible choice for supporting dual connectivity for concurrent LTE UL and NR UL activities on the same carrier frequency, frequency division multiplexing techniques may be used by a wireless device. Accordingly, FIG. 7 is a flowchart diagram illustrating an example method for a wireless device to use FDM transmission in the same carrier frequency for inter-RAT dual connectivity. Aspects of the method of FIG. 7 may be implemented by a wireless device such as a UE 106 illustrated in various of the Figures herein, or more generally in conjunction with any of the computer systems or devices shown in the above Figures, among other devices, as desired.

In various embodiments, some of the elements of the method shown may be performed concurrently, in a different order than shown, may be substituted for by other method elements, or may be omitted. Additional elements may also be performed as desired. As shown, the method may operate as follows.

At 702, the wireless device may establish cellular links according to a first RAT and a second RAT. This may include attaching to a first base station that operates according to the first RAT, which may provide a first cell operating in a first system bandwidth (e.g., including a first carrier frequency). This may further include attaching to a second base station that operates according to the second RAT, which may provide a second cell operating in a second system bandwidth (e.g., including a second carrier frequency), which may be separate from/different than (e.g., non-overlapping with) the first system bandwidth. Note that the first base station and the second base station may be different physical base stations or may be provided by the same physical base station and may differ only logically (e.g., a base station may be capable of providing cells according to both the first RAT and the second RAT).

In some embodiments, one of the RATs may be LTE and the other RAT may be NR; for example, the first RAT may be LTE and the second RAT may be NR, or the first RAT may be NR and the second RAT may be LTE. The order in which the cellular links are established may be arbitrary or may depend on any of various considerations, potentially including network architecture (e.g., if one of the base stations is intended for NSA operation and/or is a secondary base station), relative signal strength, relative priority level, etc. As one possibility, the wireless device may initially transmit signaling to an LTE base station, such as eNB 602 described previously herein, to establish an attachment to an LTE network. In other words, the wireless device may request a connection with the LTE base station.

In some embodiments, prior to transmitting the message, the wireless device may couple (e.g., via a switch) an uplink antenna to a transmit chain dedicated to LTE uplink transmissions, e.g., as described above in reference to FIG. 5. Alternatively, at least according to some embodiments, the wireless device may include sufficient uplink antennas that LTE and 5G NR uplink activities can be performed concurrently using separate antennas.

Continuing with the preceding example, in some instances the wireless device may transmit signaling to a 5G NR base station, such as gNB 604 described previously herein, to establish an attachment to a 5G NR network. In other words, the wireless device may request a connection with the 5G NR base station. In some embodiments, prior to transmitting the signaling, the wireless device may couple (e.g., via a switch) an uplink antenna to a transmit chain dedicated to 5G NR uplink transmissions, e.g., as described above in reference to FIG. 5. Alternatively, as previously noted, the wireless device may include sufficient uplink antennas that LTE and 5G NR uplink activities can be performed concurrently using separate antennas.

In some instances, the wireless device may receive an indication (e.g., from the LTE base station) that dual connectivity has been established. In other words, the wireless device may receive a message including one or more bits indicating that a connection with both the LTE base station and the 5G NR base station has been established. In some embodiments, the UE may receive the indication via a downlink antenna coupled to a receive chain dedicated to receiving LTE downlink transmissions, e.g., as described above in reference to FIG. 5.

In 704, the wireless device may determine whether one or both of the first RAT and the second RAT are scheduled to transmit at a given time (e.g., in the same subframe or slot, or otherwise in a temporally overlapping manner). The determination may be based on semi-static and/or dynamic scheduling indications from the first base station and/or the second base station. For example, in some instances, 5G NR operation may include time division duplexing between downlink and uplink slots, and indications may be provided of which slots are downlink slots and which slots are uplink slots. In LTE operation, certain resources may be semi-statically configured for control signaling. For example, certain resources may be set aside in an LTE uplink carrier for a LTE physical uplink control channel (PUCCH), a physical random access channel (PRACH), and/or sounding reference signals (SRS), according to some embodiments. Additionally, certain resources may be provided (e.g., dynamicaly scheduled by providing an uplink grant via downlink control information) for data communication, according to some embodiments.

If uplink activity is scheduled according to only one or the other RAT, the uplink activity may be performed on the system bandwidth (e.g., on an uplink carrier frequency) associated with that RAT. Thus, the wireless device might perform uplink activity for the first RAT in the first system bandwidth if uplink activity is scheduled according to only the first RAT, and might perform uplink activity for the second RAT in the second system bandwidth if uplink activity is scheduled according to only the second RAT.

However, if uplink activity is scheduled according to both the first RAT and the second RAT, in 706, the wireless device may perform uplink activity for the first RAT and the second RAT in the same carrier frequency using frequency division multiplexing. According to various embodiments, the carrier frequency on which the frequency division multiplexed uplink communication for the first and second RATs is performed may be in a carrier frequency for the first RAT or a carrier frequency for the second RAT; for example, if the RATs include LTE and NR, the frequency division multiplexed uplink communication may be performed in either LTE system bandwidth or in NR system bandwidth.

In some instances, frequency division multiplexing the uplink activity for the first RAT and the second RAT may include performing uplink activity for the first RAT in a first portion of the selected carrier frequency, and performing uplink activity for the second RAT in a second portion of the selected carrier frequency, such that there is a guard band between the first portion of the selected carrier frequency and the second portion of the selected carrier frequency on which the wireless device does not perform uplink activity.

In some instances, frequency division multiplexing the uplink activity for the first RAT and the second RAT may include receiving configuration information preconfiguring time-frequency resources of the selected carrier frequency for one or both of the first RAT and the second RAT, and/or receiving configuration information dynamically configuring time-frequency resources of the selected carrier frequency for one or both of the first RAT and the second RAT, e.g., such that there is more flexibility in which portion(s) of the selected carrier frequency are allocated to each of the first RAT and the second RAT. The configuration information indicating the time-frequency resources provided for uplink communication may be received from either or both of the first base station (e.g., according to the first RAT) or the second base station (e.g., according to the second RAT). For example, the first base station may configure time-frequency resources of the selected carrier frequency for uplink communication according to the first RAT, while the second base station may configure time-frequency resources of the selected carrier frequency for uplink communication according to the second RAT, in a coordinated manner such that the time-frequency resources of the selected carrier frequency are not scheduled in a conflicting manner. Thus, the wireless device may perform concurrent uplink activity for the first second RAT and the second RAT using the preconfigured and/or dynamically configured time-frequency resources of the selected carrier frequency.

The wireless device may utilize any of various possible transmission configurations to support concurrent or simultaneous frequency division multiplexed communication according to multiple RATs using the same carrier frequency, as desired. As one possibility, the wireless device may include separate transmit chains for each RAT, for example such that uplink signals for the first RAT are generated and transmitted using first RAT circuitry and a first antenna, while uplink signals for the second RAT are generated and transmitted using second RAT circuitry and a second antenna. Alternatively, each RAT may have a separate transceiver chain capable of generating signals according to that respective RAT, but the RATs may share one or more antennas (e.g., such as in accordance with the transceiver architecture of FIG. 5). In this case, the circuitry for one or both RATs may be configured to be capable of frequency shifting its uplink signals to the carrier frequency associated with the other RAT (e.g., may include a local oscillator capable of generating signals at the carrier frequency associated with the other RAT).

As another possibility, the uplink signals for the first RAT and the second RAT may be multiplexed in the time domain and transmitted jointly (e.g., using a single antenna or multiple antennas). For example, uplink signals for the first RAT may be generated using first RAT circuitry, while uplink signals for the second RAT may be generated using second RAT circuitry, and the uplink signals for the first RAT and the uplink signals for the second RAT may be multiplexed (e.g., combined) in the time domain (e.g., after inverse Fourier transform). Further, when being multiplexed in the time domain, the uplink signals for the first RAT and the second RAT may be added in the digital domain (e.g., prior to digital to analog conversion) or combined in the analog domain (e.g., after digital to analog conversion), according to various embodiments, as desired.

As a still further possibility, the uplink signals for the first RAT and the second RAT may be multiplexed in the frequency domain (e.g., prior to inverse Fourier transform) and transmitted jointly (e.g., using a single antenna or multiple antennas). For example, uplink signals for the first RAT may be generated using first RAT circuitry, while uplink signals for the second RAT may be generated using second RAT circuitry, and the uplink signals for one of the RATs may be provided to the circuitry for the other RAT, which may add the first RAT and second RAT frequency domain signals. If desired, one or more transformations may be applied to one or both of the RATs' frequency domain signals. For example, a matrix multiplication or linear transformation may be applied, if desired. The combined first RAT and second RAT uplink signals may subsequently be processed using inverse Fourier transform to convert them to the time domain, may undergo digital to analog conversion, and may be transmitted jointly.

FIGS. 8-18

FIGS. 8-18 and the information provided herein below in conjunction therewith are provided by way of example of various considerations and details relating to possible systems in which the method of FIG. 7 and/or other aspects of this disclosure may be implemented, and are not intended to be limiting to the disclosure as a whole. Numerous variations and alternatives to the details provided herein below are possible and should be considered within the scope of the disclosure.

Figure 8:
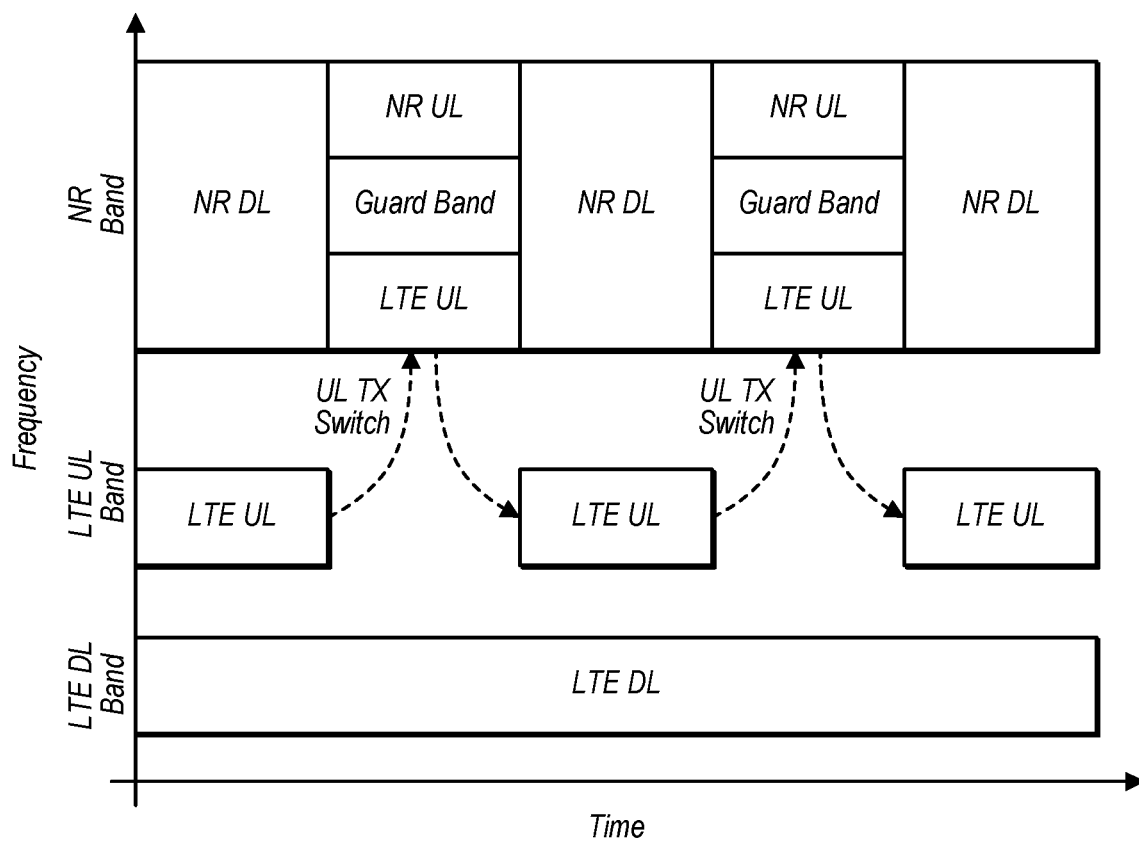
FIG. 8 illustrates an example scenario in which FDM transmission in a 5G NR carrier frequency is used for inter-RAT dual connectivity, according to some embodiments.

Since uplink communication for wireless devices may in many instances have low traffic in comparison with downlink communication, and since NR UL bandwidth may commonly be larger than LTE UL bandwidth, it may be possible to perform FDM between LTE UL and NR UL using NR system resources by semi-static configuration. FIG. 8 illustrates an example scenario in which FDM transmission in a 5G NR carrier frequency is used for inter-RAT dual connectivity, according to some embodiments.

As shown in the illustrated example scenario, there may be an LTE uplink band (having bandwidth "$B_{LTE}$") and a NR band (having bandwidth "$B_{NR}$"). During NR UL frames, part of the contiguous NR bandwidth in the amount of $B_{LTE}$ may be allocated to LTE UL, and another contiguous NR bandwidth in an amount of "$B_{UL-NR}$" may be allocated to NR UL. Between the NR and LTE UL portions, a guard band ("$B_{GUARD}$", which may be equal to $B_{NR}$-$B_{LTE}$-$B_{UL-NR}$) may be allocated. The size of the guard band can be selected based on the preferred balance between minimizing bandwidth loss due to multiplexing and reducing interference between the LTE and NR signals. The bandwidth partition(s) may be semi-statically configured, e.g., depending on traffic need, and may be signaled using respective LTE/NR RRC signaling. The start and end of the LTE and NR bandwidth may also be specified respectively, if desired.

Thus, in a scenario with such NR bandwidth partitioning between LTE and NR, a dual-connectivity UE may transmit on allocated bandwidth in the NR system bandwidth if the UE has LTE PUSCH or PUCCH transmissions to perform and the UE also has NR uplink traffic. If the UE has LTE PUSCH or PUCCH transmissions to perform but the UE does not have any NR uplink traffic, the UE may transmit on either LTE UL bandwidth or on the allocated bandwidth in the NR system bandwidth, e.g., as desired or according to system configuration. If the UE has LTE PUSCH or PUCCH transmissions to perform and the NR traffic is downlink traffic, the UE may transmit on LTE UL bandwidth. Note that a configuration such as illustrated in the example scenario of FIG. 8 may require timing synchronization between NR and LTE, at least according to some embodiments, but may be possible at different numerology (e.g., subcarrier spacing, cyclic prefix length, number of OFDM symbols, etc.), e.g., as the guard band may provide sufficient frequency separation to allow the two RATs to operate concurrently and independently.

Figure 9:
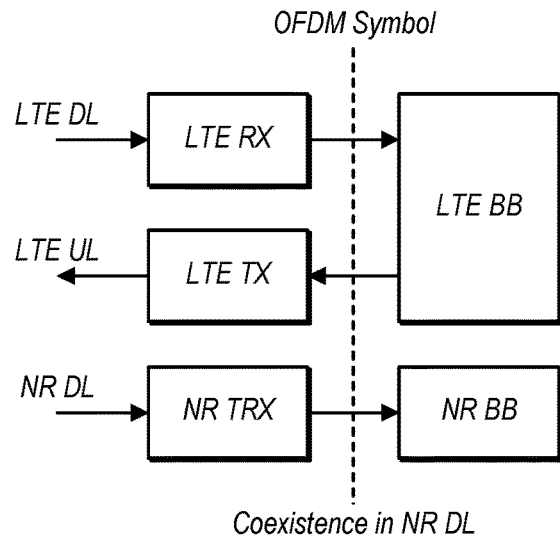
FIGS. 9-12 illustrate examples of possible transceiver architectures that could be used in conjunction with the scenario of FIG. 8, according to some embodiments.

FIGS. 9-12 illustrate examples of possible transceiver architectures that could be used in conjunction with the scenario of FIG. 8, according to some embodiments. As illustrated in FIG. 9, when there is NR DL traffic, it may be the case that LTE traffic is on UL and DL concurrently. As previously discussed herein, in this case the LTE circuitry may be able to transmit in LTE UL bandwidth while LTE DL and NR DL operations are also occuring, without the downlink operations being subject to interference/desensing from intermodulation products of uplink transmissions in multiple frequency bands.

Figure 10:
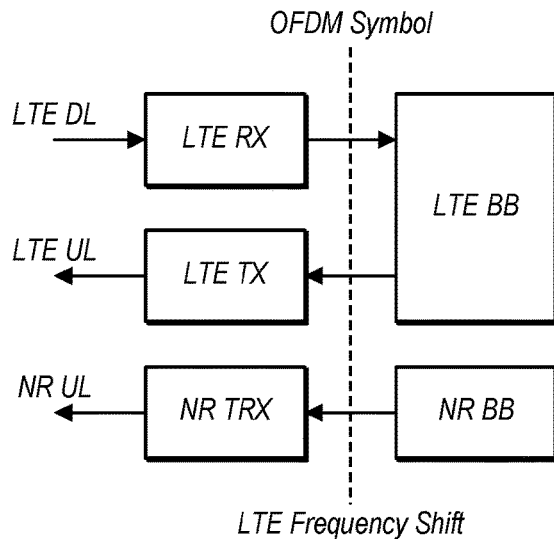

FIG. 10 illustrates a transceiver architecture in which the LTE transmitter shifts its UL center frequency to the desired NR UL frequency. The LTE baseband signal may be generated and fed to the LTE transmitter and may be transmitted via LTE. This may have the advantage of independent operation of NR and LTE circuitries, but may place greater requirements on the LTE transceiver circuitry, e.g., duplexer, LO, RF filter, etc.

Figure 11:
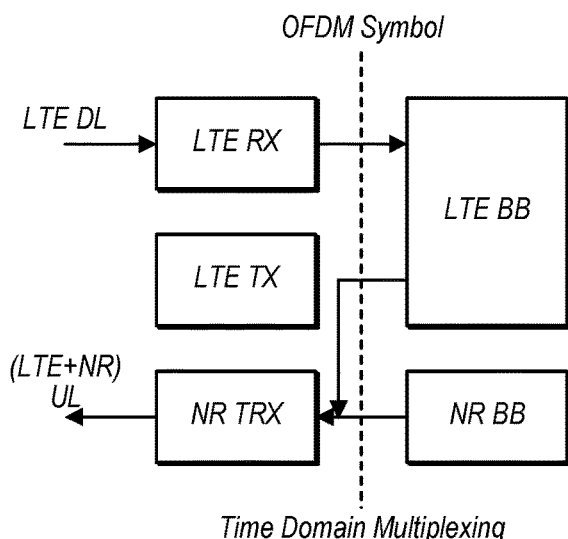

FIG. 11 illustrates a transceiver architecture in which LTE generates time-domain OFDM symbols and then multiplexes them with NR OFDM symbols. In this case, the NR transmitter may transmit the combined NR and LTE UL signals. There may be multiple options for combining the LTE and NR UL signals in the NR transceiver. As one option, the LTE and NR UL signals may be added in the digital domain (e.g., before DAC but after OFDM symbol generation). After digital addition, the added signal may be mapped to one antenna or more than one antenna (e.g., digital addition per transmitter antenna can be performed, if desired). As another option, the LTE and NR UL signals may be added in analog domain (e.g., after DAC, via a combiner). This approach may have minimal impact on the LTE transceiver, but may require additional processing to combine the LTE and NR UL signals in the digital or analog domain.

Figure 12:
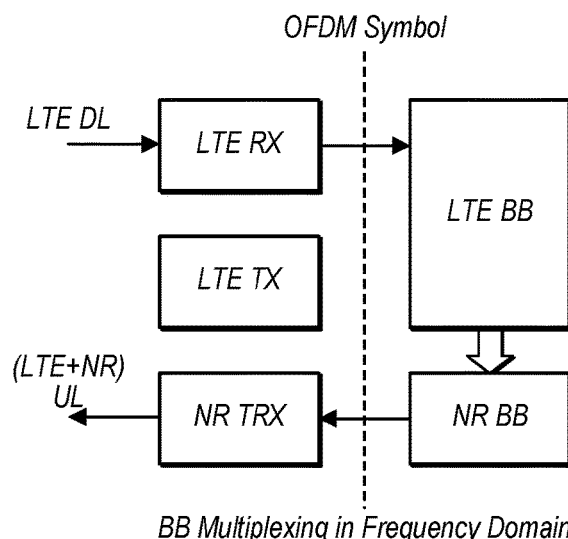

FIG. 12 illustrates a transceiver architecture in which LTE generates frequency domain signals (before IFFT) and shares those signals with the NR baseband. NR may add NR and LTE frequency domain signals and feed those combined signals into IFFT operation. This approach may have reduced complexity with respect to performing time-domain addition, and may allow for LTE and NR to be combined even if different numerologies are used (e.g., the signals may still be combined in the frequency domain and fed into a single IFFT module by preprocessing the signals), but may require additional baseband processing.

Figure 13:
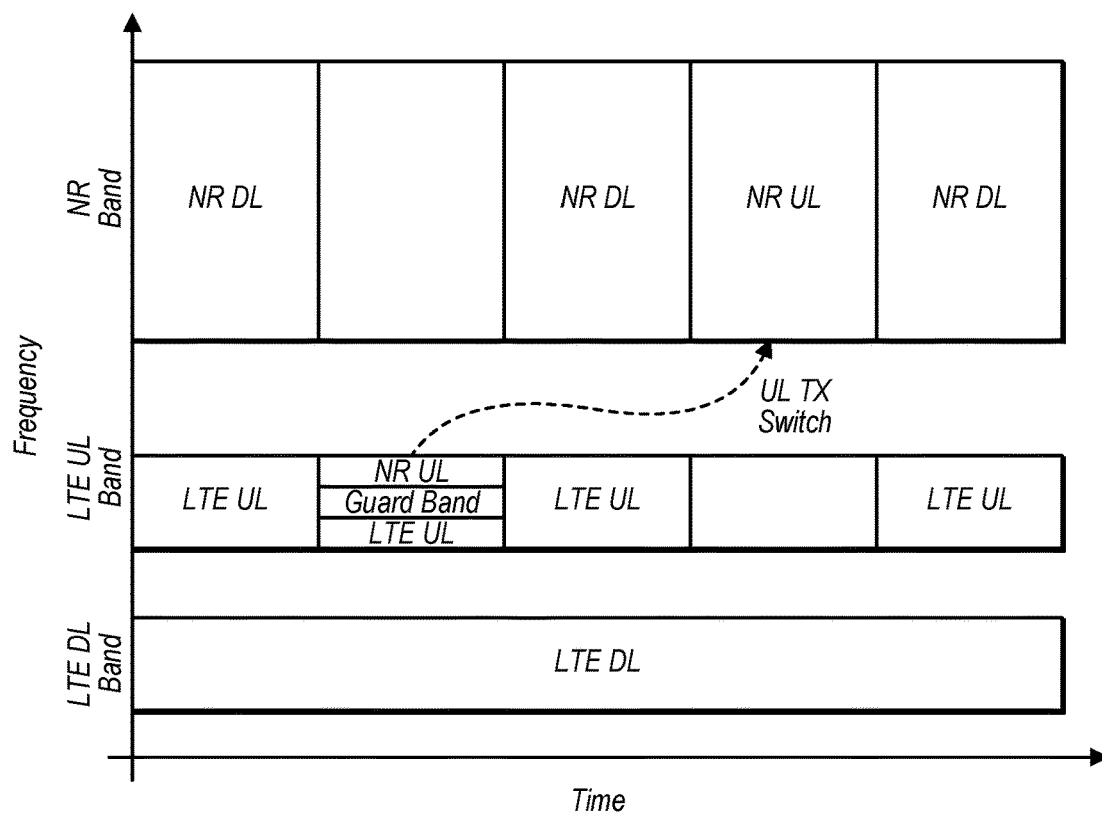
FIGS. 13-14 illustrate example scenarios in which FDM transmission in a LTE carrier frequency is used for inter-RAT dual connectivity, according to some embodiments.
Figure 13:
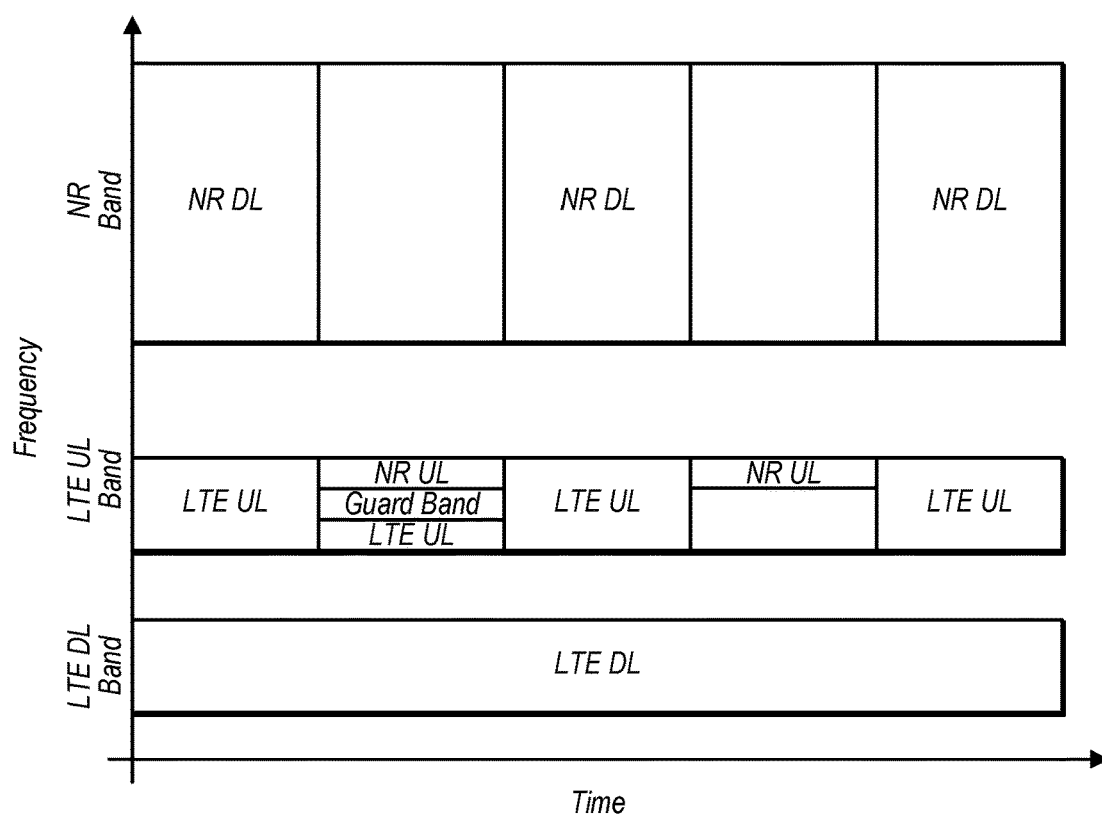

FIG. 13 illustrates example scenarios in which FDM transmission in a LTE carrier frequency is used for inter-RAT dual connectivity, according to some embodiments, e.g., as alternatives to the example scenario of FIG. 8.

As shown in the illustrated example scenario, there may be a LTE uplink band (having bandwidth "$B_{LTE}$") and a NR band (having bandwidth "$B_{NR}$"). During NR UL frames, part of the contiguous LTE bandwidth in the amount of $B_{UL-LTE}$ may be allocated to LTE UL, and another contiguous part of the LTE bandwidth in an amount of "$B_{UL-NR}$" may be allocated to NR UL. Between the NR and LTE UL portions, a guard band ("$B_{GUARD}$", which may be equal to $B_{LTE}$-$B_{UL-LTE}$-$B_{UL-NR}$) may be allocated. The size of the guard band can be selected based on the preferred balance between minimizing bandwidth loss due to multiplexing and reducing interference between the LTE and NR signals. The bandwidth partition(s) may be semi-statically configured, e.g., depending on traffic need, and may be signaled using respective LTE/NR RRC signaling. The start and end of the LTE and NR bandwidth may also be specified respectively, if desired.

Thus, in a scenario with such LTE bandwidth partitioning between LTE and NR, a dual-connectivity UE may transmit on allocated bandwidth in the LTE system bandwidth if the UE has LTE PUSCH or PUCCH transmissions to perform and the UE also has NR uplink traffic. If the UE has no LTE uplink transmissions to perform and does have NR uplink traffic, the UE may transmit the NR signals on either the NR bandwidth (e.g., as in the upper portion of FIG. 13) or on the allocated bandwidth in the LTE system bandwidth (e.g., as in the lower portion of FIG. 13), e.g., as desired or according to system configuration. If the UE has LTE PUSCH or PUCCH transmissions to perform and the NR traffic is downlink traffic, the UE may transmit on the full LTE UL bandwidth. Note that, similar to the example scenario of FIG. 8, a configuration such as illustrated in the example scenario of FIG. 13 may require timing synchronization between NR and LTE, at least according to some embodiments, but may be possible at different numerology (e.g., subcarrier spacing, cyclic prefix length, number of OFDM symbols, etc.), e.g., as the guard band may provide sufficient frequency separation to allow the two RATs to operate concurrently and independently.

Figure 14:
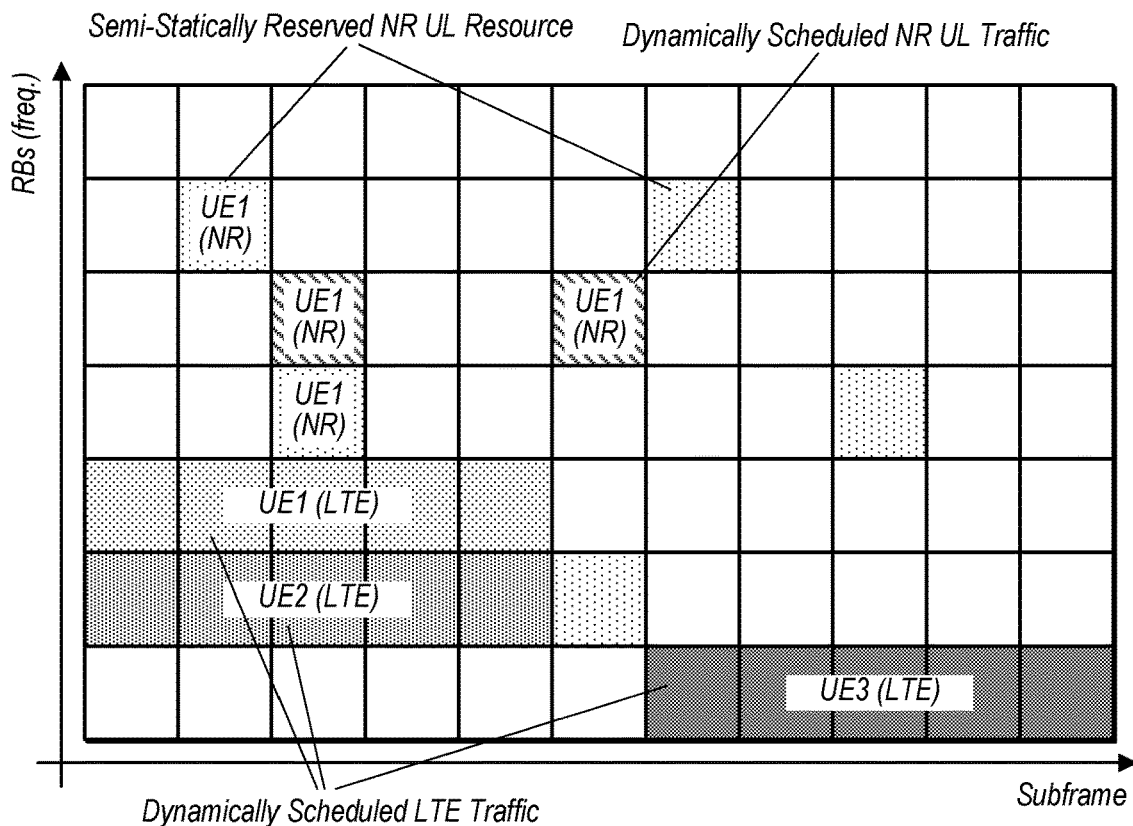
Figure 14:
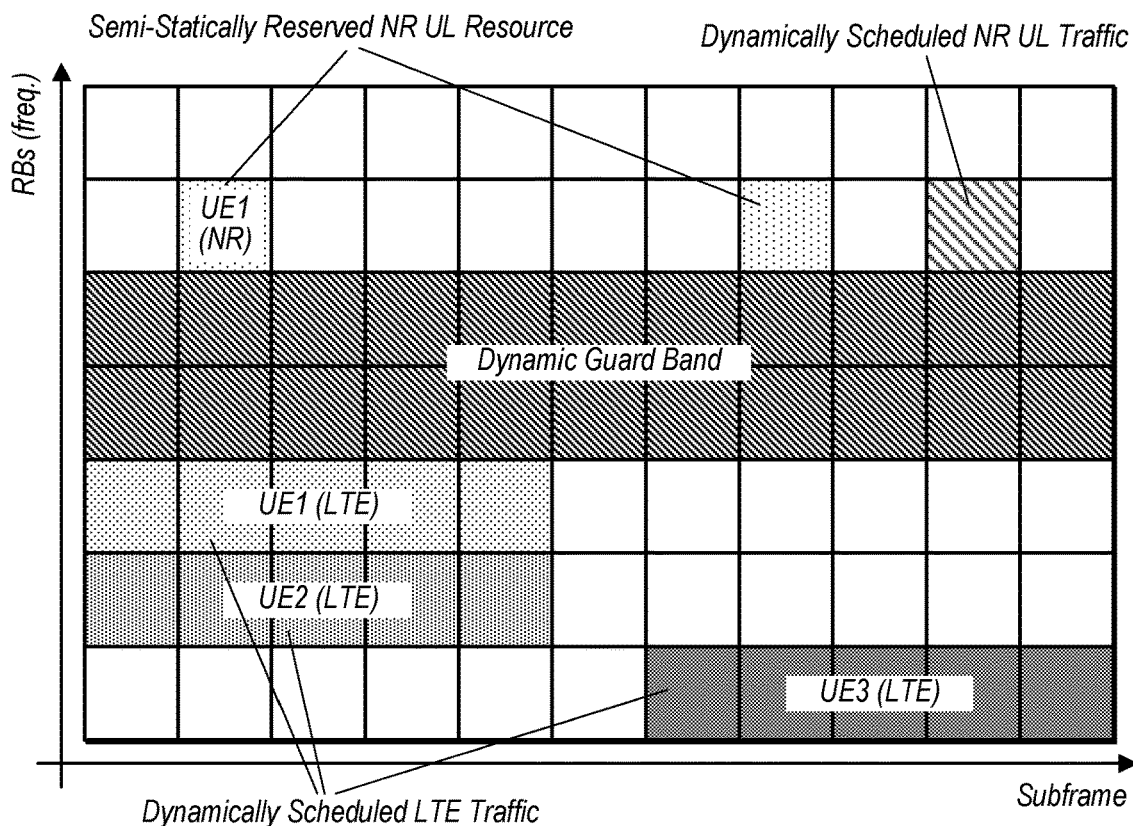

FIG. 14 also illustrates example scenarios in which FDM transmission in a LTE carrier frequency is used for inter- RAT dual connectivity, according to some embodiments. In contrast to the example scenario of FIG. 13, in the scenarios of FIG. 14, the time-frequency resources of the LTE carrier frequency may be more flexibly allocated between LTE and NR.

In the upper portion of FIG. 14, an example scenario in which a portion of the resource blocks of the LTE UL bandwidth are reserved for NR UL traffic, and further in which the reserved RBs occupy a set of preconfigured RBs following a RB hopping pattern, is illustrated. Similar scenarios in which the reserved RBs occupy a set of preconfigured RBs for temporally contiguous subframes, or in which the reserved RBs occupy a set of preconfigured RBs for temporally discontiguous subframes, are also possible. In all such scenarios, the reserved RBs can be used to transmit NR UL traffic. The pattern may be semi-statically configured to NR and may be transparent to LTE (e.g., the eNB may just not schedule any PUSCH on these RBs).

The LTE and NR scheduler may coordinate such that LTE and NR UL transmissions can also be dynamically scheduled on LTE RBs, as also shown. Note that in such scenarios, the NR UL may be configured with the same numerology (e.g., subcarrier spacing, cyclic prefix and OFDM symbol length, and subcarrier shift) as LTE UL. The LTE and NR UL activities of a UE may effectively be treated as two independent UEs (e.g., scheduled independently by LTE and NR to use the LTE UL frequency resources).

In some instances, (e.g., if interference may be present between LTE and NR), the LTE UL band may be restricted with respect to scheduling LTE and NR resources, to create a guard band to reduce the interference. The bottom portion of FIG. 14 illustrates such an example scenario. Note that in this case the guard band may not need to be signaled to either LTE or NR wireless devices (e.g., may be implemented using LTE scheduling) and may be dynamically changed (e.g., increased or decreased in width, added or removed), e.g., based on interference level, traffic conditions, and/or any of various other considerations. In this case, LTE and NR may each be scheduled for one or the other side of the guard band, e.g., such that each RAT may not cross or be provided resources split across the two sides of the guard band.

Figure 15:
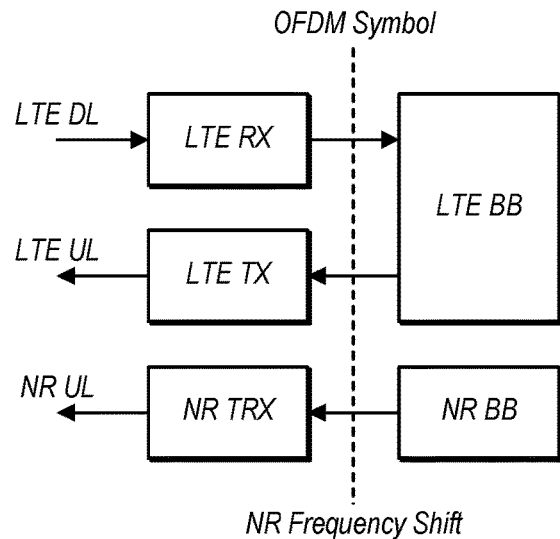
FIGS. 15-17 illustrate examples of possible transceiver architectures that could be used in conjunction with the scenarios of FIGS. 13-14, according to some embodiments.
Figure 16:
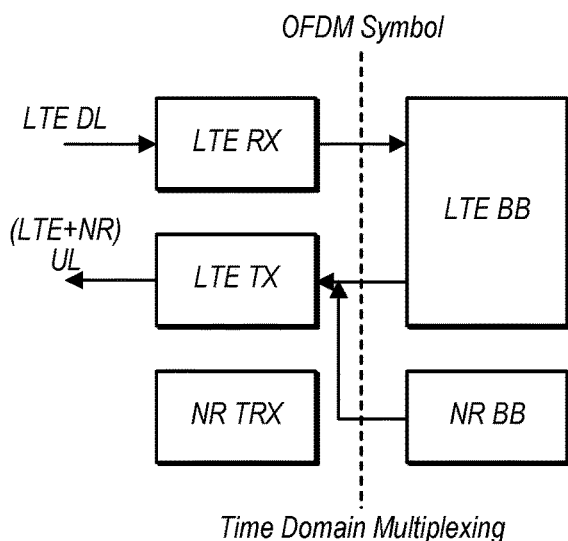
Figure 17:
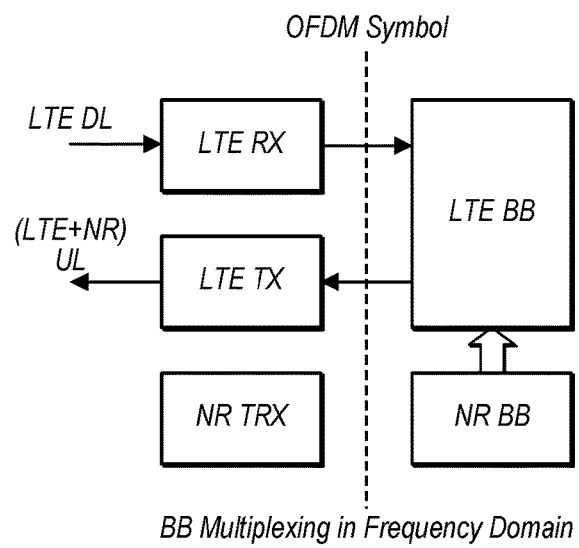

FIGS. 15-17 illustrate examples of possible transceiver architectures that could be used in conjunction with the scenarios of FIGS. 13-14, according to some embodiments. Note that the architctures may be similar to those of FIGS. 10-12, but with the modifications being made to accomodate the frequency shifting of NR signals to the LTE UL system bandwidth rather than to accomodate the frequency shifting of LTE signals to the NR system bandwidth.

FIG. 15 illustrates a transceiver architecture in which the NR transmitter shifts its UL center frequency to the desired LTE UL frequency. The NR baseband signal may be generated and fed to the NR transmitter and may be transmitted via NR. This may have the advantage of independent operation of NR and LTE circuitries, but may place greater requirements on the NR transceiver circuitry, e.g., duplexer, LO, RF filter, etc.

FIG. 16 illustrates a transceiver architecture in which NR generates time-domain OFDM symbols and then multiplexes them with LTE OFDM symbols. In this case, the LTE transmitter may transmit the combined NR and LTE UL signals. There may be multiple options for combining the LTE and NR UL signals in the LTE transceiver. As one option, the LTE and NR UL signals may be added in digital domain (e.g., before DAC but after OFDM symbol generation). Digital addition per transmitter antenna can be performed, if desired. As another option, the LTE and NR UL signals may be added in analog domain (e.g., after DAC, via a combiner). This approach may have minimal impact on the NR transceiver, but may require additional processing to combine the LTE and NR UL signals in the digital or analog domain.

FIG. 17 illustrates a transceiver architecture in which NR generates frequency domain signals (before IFFT) and shares those signals with the LTE baseband. LTE may add NR and LTE frequency domain signals and feed those combined signals into IFFT operation. This approach may have reduced complexity with respect to performing time-domain addition, and may allow for LTE and NR to be combined even if different numerologies are used (e.g., the signals may still be combined in the frequency domain and fed into a single IFFT module by preprocessing the signals), but may require additional baseband processing.

FIG. 18 illustrates an example scenario in which LTE uplink control resources can be semi-statically reserved for legacy and/or dual connectivity UEs, according to some embodiments. In this example scenario, LTE downlink may be freely scheduled and DL ACK/NACK and CSI may always be transmitted on the LTE PUCCH region that is reserved. The eNB may schedule LTE PUSCH and NR UL activities at different subframes, e.g., in addition to the reserved LTE UL control resources in each subframe. This may reduce scheduling restrictions, since DL ACK/NACK may be provided through the reserved PUCCH (e.g., no need to multiplex with NR UL activities). Such an approach may benefit from potentially unrestricted LTE DL scheduling and ability to transmit periodic CSI, etc., on the PUCCH (e.g., given the relatively small payload), but may result in SRS for NR not being fully used for NR DL precoding purposes.

In the following further exemplary embodiments are provided.

One set of embodiments may include a method, comprising: by a wireless device: establishing a first wireless link with a first base station according to a first radio access technology (RAT), wherein the first base station provides a first cell operating in a first system bandwidth; establishing a second wireless link with a second base station according to a second radio access technology (RAT), wherein the second base station provides a second cell operating in a second system bandwidth; determining whether the wireless device has uplink activity scheduled according to both the first RAT and the second RAT; and performing uplink activity for both the first RAT and the second RAT in the first system bandwidth using frequency division multiplexing if uplink activity is scheduled according to both the first RAT and the second RAT;

According to some embodiments, performing uplink activity for both the first RAT and the second RAT in the first system bandwidth using frequency division multiplexing further comprises: performing uplink activity for the first RAT in a first portion of the first system bandwidth; and performing uplink activity for the second RAT in a second portion of the first system bandwidth, wherein the wireless device does not perform uplink activity on a guard band portion of the first system bandwidth between the first portion of the first system bandwidth and the second portion of the first system bandwidth.

According to some embodiments, the method further comprises switching transceiver circuitry of the wireless device to perform uplink activity for the second RAT in the second system bandwidth if uplink activity at the wireless device is scheduled according to only the second RAT.

According to some embodiments, performing uplink activity for both the first RAT and the second RAT in the first system bandwidth using frequency division multiplexing further comprises: receiving configuration information pre-configuring time-frequency resources of the first system bandwidth for the second RAT; receiving configuration information dynamically configuring time-frequency resources of the first system bandwidth for the second RAT; and performing uplink activity for the second RAT using the preconfigured and dynamically configured time-frequency resources of the first system bandwidth.

According to some embodiments, the configuration information dynamically schedules a guard band, wherein the time-frequency resources of the first system bandwidth that are preconfigured and dynamically configured for use by the second RAT are scheduled on one side of the guard band, wherein time-frequency resources of the first system bandwidth that are configured for use by the first RAT are scheduled on an opposite side of the guard band, wherein the guard band comprises a set of contiguous unused time-frequency resources of the first system bandwidth.

According to some embodiments, uplink activity for each of the first RAT and the second RAT is also performed in the first system bandwidth if uplink activity at the wireless device is scheduled according to only the first RAT or if uplink activity at the wireless device is scheduled according to only the second RAT.

According to some embodiments, performing uplink activity for both the first RAT and the second RAT in the first system bandwidth using frequency division multiplexing further comprises: generating and transmitting uplink signals for the first RAT using first RAT circuitry and a first antenna; and generating and transmitting uplink signals for the second RAT using second RAT circuitry and a second antenna, wherein the second RAT circuitry is configured to frequency shift the uplink signals for the second RAT to the first system bandwidth.

According to some embodiments, performing uplink activity for both the first RAT and the second RAT in the first system bandwidth using frequency division multiplexing further comprises: generating uplink signals for the first RAT using first RAT circuitry; generating uplink signals for the second RAT using second RAT circuitry; multiplexing the uplink signals for the first RAT and the uplink signals for the second RAT in the time domain; and transmitting the multiplexed uplink signals for the first RAT and uplink signals for the second RAT using a first antenna.

According to some embodiments, the uplink signals for the first RAT and the uplink signals for the second RAT that are multiplexed comprise digital signals.

According to some embodiments, the uplink signals for the first RAT and the uplink signals for the second RAT that are multiplexed comprise analog signals.

According to some embodiments, performing uplink activity for both the first RAT and the second RAT in the first system bandwidth using frequency division multiplexing further comprises: generating uplink signals for the first RAT using first RAT circuitry; generating uplink signals for the second RAT using second RAT circuitry; multiplexing the uplink signals for the first RAT and the uplink signals for the second RAT in the frequency domain; and transmitting the multiplexed uplink signals for the first RAT and uplink signals for the second RAT using a first antenna.

According to some embodiments, the first RAT comprises LTE, and the second RAT comprises 5G NR.

According to some embodiments, the first RAT comprises 5G NR, and the second RAT comprises LTE.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. An apparatus, comprising:
a processing element configured to cause a wireless device to:
establish a first wireless link with a first cell according to a first radio access technology (RAT), wherein the first cell operates in a first system bandwidth;
establish a second wireless link with a second cell according to a second radio access technology (RAT), wherein the second cell operates in a second system bandwidth;
determine whether the wireless device has uplink activity scheduled according to both the first RAT and the second RAT; and
perform uplink activity for both the first RAT and the second RAT in the first system bandwidth involving frequency division multiplexing if uplink activity is scheduled according to both the first RAT and the second RAT, wherein to perform uplink activity for both the first RAT and the second RAT in the first system bandwidth involving frequency division multiplexing, the processing element is further configured to cause the wireless device to:
  perform uplink activity for the first RAT in a first portion of the first system bandwidth; and
  perform uplink activity for the second RAT in a second portion of the first system bandwidth, wherein the wireless device does not perform uplink activity on a guard band portion of the first system bandwidth between the first portion of the first system bandwidth and the second portion of the first system bandwidth.

2. The apparatus of claim 1, wherein the processing element is further configured to cause the wireless device to:
  switch transceiver circuitry of the wireless device to perform uplink activity for the second RAT in the second system bandwidth if uplink activity at the wireless device is scheduled according to only the second RAT.

3. The apparatus of claim 1, wherein to perform uplink activity for both the first RAT and the second RAT in the first system bandwidth involving frequency division multiplexing, the processing element is further configured to cause the wireless device to:
  receive configuration information preconfiguring time-frequency resources of the first system bandwidth for the second RAT;
  receive configuration information dynamically configuring time-frequency resources of the first system bandwidth for the second RAT; and
  perform uplink activity for the second RAT using the preconfigured and dynamically configured time-frequency resources of the first system bandwidth.

4. The apparatus of claim 3,
  wherein the configuration information dynamically schedules the guard band portion, wherein the time-frequency resources of the first system bandwidth that are preconfigured and dynamically configured for use by the second RAT are scheduled on one side of the guard band portion, wherein time-frequency resources of the first system bandwidth that are configured for use by the first RAT are scheduled on an opposite side of the guard band,
  wherein the guard band portion comprises a set of contiguous unused time-frequency resources of the first system bandwidth.

5. The apparatus of claim 3,
  wherein uplink activity for each of the first RAT and the second RAT is also performed in the first system bandwidth if uplink activity at the wireless device is scheduled according to only the first RAT or if uplink activity at the wireless device is scheduled according to only the second RAT.

6. The apparatus of claim 1, wherein to perform uplink activity for both the first RAT and the second RAT in the first system bandwidth, the processing element is further configured to cause the wireless device to:
  receive configuration information dynamically configuring time-frequency resources of the first system bandwidth for the second RAT, wherein the dynamically configured time-frequency resources of the first system bandwidth for the second RAT comprise a resource block allocation for a first subframe; and
  perform uplink activity for the second RAT using the dynamically configured time-frequency resources of the first system bandwidth.

7. The method of claim 6, wherein performing uplink activity for both the first RAT and the second RAT in the first system bandwidth using frequency division multiplexing further comprises:
  generating uplink signals for the first RAT using first RAT circuitry;
  generating uplink signals for the second RAT using second RAT circuitry;
  multiplexing the uplink signals for the first RAT and the uplink signals for the second RAT in the frequency domain; and
  transmitting the multiplexed uplink signals for the first RAT and uplink signals for the second RAT using a first antenna.

8. The method of claim 6,
  wherein the first RAT comprises LTE,
  wherein the second RAT comprises 5G NR.

9. The method of claim 6,
  wherein the first RAT comprises 5G NR,
  wherein the second RAT comprises LTE.

10. A method, comprising:
  by a wireless device:
  establishing a first wireless link with a first cell according to a first radio access technology (RAT), wherein the first cell operates in a first system bandwidth;
  establishing a second wireless link with a second cell according to a second radio access technology (RAT), wherein the second cell operates in a second system bandwidth;
  determining whether the wireless device has uplink activity scheduled according to both the first RAT and the second RAT; and
  performing uplink activity for both the first RAT and the second RAT in the first system bandwidth using frequency division multiplexing if uplink activity is scheduled according to both the first RAT and the second RAT, wherein said performing uplink activity for both the first RAT and the second RAT in the first system bandwidth using frequency division multiplexing includes:
    performing uplink activity for the first RAT in a first portion of the first system bandwidth; and
    performing uplink activity for the second RAT in a second portion of the first system bandwidth, wherein the wireless device does not perform uplink activity on a guard band portion of the first system bandwidth between the first portion of the first system bandwidth and the second portion of the first system bandwidth.

11. The method of claim 10, wherein performing uplink activity for both the first RAT and the second RAT in the first system bandwidth using frequency division multiplexing further comprises:
  generating and transmitting uplink signals for the first RAT using first RAT circuitry and one or more first antennas; and
  generating and transmitting uplink signals for the second RAT using second RAT circuitry and one or more second antennas, wherein the second RAT circuitry is configured to frequency shift the uplink signals for the second RAT to the first system bandwidth.

12. The method of claim 10, wherein performing uplink activity for both the first RAT and the second RAT in the first system bandwidth using frequency division multiplexing further comprises:
  generating uplink signals for the first RAT using first RAT circuitry;
  generating uplink signals for the second RAT using second RAT circuitry;
  multiplexing the uplink signals for the first RAT and the uplink signals for the second RAT in the time domain, wherein the uplink signals for the first RAT and the uplink signals for the second RAT that are multiplexed comprise digital signals; and
  transmitting the multiplexed uplink signals for the first RAT and uplink signals for the second RAT using one or more antennas.

13. The method of claim 10, wherein performing uplink activity for both the first RAT and the second RAT in the first system bandwidth using frequency division multiplexing further comprises:
  generating uplink signals for the first RAT using first RAT circuitry;
  generating uplink signals for the second RAT using second RAT circuitry;
  multiplexing the uplink signals for the first RAT and the uplink signals for the second RAT in the time domain, wherein the uplink signals for the first RAT and the uplink signals for the second RAT that are multiplexed comprise analog signals; and
  transmitting the multiplexed uplink signals for the first RAT and uplink signals for the second RAT using one or more antennas.

14. A device, comprising:
  an antenna;
  a radio coupled to the antenna; and
  a processing element coupled to the radio;
  wherein the device is configured to:
    establish a first cellular link with a first cell according to a first radio access technology (RAT), wherein the first cell operates in a first system bandwidth;
    establish a second cellular link with a second cell according to a second radio access technology (RAT), wherein the second cell operates in a second system bandwidth, wherein the first system bandwidth and the second system bandwidth are separated in frequency;
    determine that the wireless device has uplink activity scheduled according to both the first RAT and the second RAT;
    perform uplink activity for the first RAT in a first portion of the first system bandwidth based at least in part on the wireless device having uplink activity scheduled according to both the first RAT and the second RAT; and
    perform uplink activity for the second RAT in a second portion of the first system bandwidth based at least in part on the wireless device having uplink activity scheduled according to both the first RAT and the second RAT,
    wherein the wireless device does not perform uplink activity on a guard band portion of the first system bandwidth between the first portion of the first system bandwidth and the second portion of the first system bandwidth based at least in part on the wireless device having uplink activity scheduled according to both the first RAT and the second RAT.

15. The device of claim 14, wherein the device is further configured to:
  generate and transmit uplink signals for the first RAT using first RAT circuitry and one or more first antennas; and
  generate and transmit uplink signals for the second RAT using second RAT circuitry and one or more second antennas, wherein the second RAT circuitry is configured to frequency shift the uplink signals for the second RAT to the second portion of the first system bandwidth based at least in part on the wireless device having uplink activity scheduled according to both the first RAT and the second RAT.

16. The device of claim 14, wherein, to perform uplink activity for the first RAT in the first portion of the first system bandwidth and perform uplink activity for the second RAT in the second portion of the first system bandwidth, the device is further configured to:
  generate uplink signals for the first RAT using first RAT circuitry;
  generate uplink signals for the second RAT using second RAT circuitry;
  multiplex the uplink signals for the first RAT and the uplink signals for the second RAT in the time domain; and
  transmit the multiplexed uplink signals for the first RAT and uplink signals for the second RAT using one or more antennas.

17. The device of claim 14, wherein, to perform uplink activity for the first RAT in the first portion of the first system bandwidth and perform uplink activity for the second RAT in the second portion of the first system bandwidth, the device is further configured to:
  generate uplink signals for the first RAT using first RAT circuitry;
  generate uplink signals for the second RAT using second RAT circuitry;
  multiplex the uplink signals for the first RAT and the uplink signals for the second RAT in the frequency domain; and
  transmit the multiplexed uplink signals for the first RAT and uplink signals for the second RAT using a first antenna.

18. The device of claim 14, wherein the device is further configured to:
  determine, at another time, that the wireless device has uplink activity scheduled according to only the second RAT; and
  switch transceiver circuitry of the wireless device to perform uplink activity for the second RAT in the second system bandwidth when the wireless device has uplink activity scheduled according to only the second RAT.

19. The device of claim 14, wherein the device is further configured to:
  determine, at another time, that the wireless device has uplink activity scheduled according to only the second RAT; and
  perform uplink activity for the second RAT in the first system bandwidth when the wireless device has uplink activity scheduled according to only the second RAT.

20. The device of claim 14, wherein the first RAT comprises LTE,
  wherein the second RAT comprises 5G NR.

* * * * *